(12) United States Patent
Argade

(10) Patent No.: US 6,223,255 B1
(45) Date of Patent: Apr. 24, 2001

(54) MICROPROCESSOR WITH AN INSTRUCTION LEVEL RECONFIGURABLE N-WAY CACHE

(75) Inventor: Pramod V. Argade, La Jolla, CA (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/002,955

(22) Filed: Jan. 5, 1998

Related U.S. Application Data

(63) Continuation-in-part of application No. 08/870,013, filed on Feb. 3, 1997, now abandoned, which is a continuation of application No. 08/383,037, filed on Feb. 3, 1995, now abandoned.

(51) Int. Cl.⁷ ..................................................... G06F 12/08
(52) U.S. Cl. ......................... 711/129; 711/120; 711/128; 711/170; 711/173
(58) Field of Search .................................. 711/128, 120, 711/170, 173, 131, 149, 129, 118

(56) References Cited

U.S. PATENT DOCUMENTS

| | | | |
|---|---|---|---|
| 4,195,342 | * 3/1980 | Joyce et al. | 711/118 |
| 4,788,656 | * 11/1988 | Sternberger | 710/52 |
| 4,853,846 | * 8/1989 | Johnson et al. | 710/101 |
| 4,853,889 | 8/1989 | Ditzel et al. | 712/337 |
| 5,014,195 | * 5/1991 | Farrell et al. | 711/128 |
| 5,025,366 | * 6/1991 | Baror | 711/128 |
| 5,367,653 | * 11/1994 | Coyle et al. | 711/128 |
| 5,412,787 | * 5/1995 | Forsyth et al. | 711/207 |
| 5,440,707 | * 8/1995 | Hayes et al. | 711/3 |
| 5,442,571 | 8/1995 | Sites | 711/133 |
| 5,500,950 | 3/1996 | Becker et al. | 711/168 |
| 5,539,892 | * 7/1996 | Reininger et al. | 711/207 |
| 5,689,696 | 11/1997 | Gibbons et al. | 707/1 |

OTHER PUBLICATIONS

Microsoft Press Computer Dictionary, Second Edition, (1994) p. 247.*

Hamacher, V. Carl et al. *Computer Organization*, Seond Edition, McGraw Hill, 1984, pp. 308–312.

* cited by examiner

Primary Examiner—Eddie P. Chan
Assistant Examiner—Yamir Encarnacion

(57) ABSTRACT

A microprocessor includes a multiply-accumulate unit (MAU) for performing high-speed signal processing operations. First and second caches provide first and second operands (x, y) directly to the MAU when a multiply-accumulate (MAC) instruction is executed. In addition, a multiplexer is included to select data from either the first and second caches when a normal instruction is executed. A translation look-aside buffer may be included that has page table entries that include additional "reconfigure" and "way" bits to control writing data into the caches. In this manner, the microprocessor may use a conventional n-way set-associative cache to simultaneously access two or more operands.

14 Claims, 4 Drawing Sheets

MICROPROCESSOR WITH AN INSTRUCTION LEVEL RECONFIGURABLE N-WAY CACHE

This is a Continuation-In-Part of application Ser. No. 08/870,013 filed Feb. 3, 1997 now abandoned which in turn is a continuation of application Ser. No. 08/383,037 filed Feb. 3, 1995, now abandoned. The entire disclosure of the prior applications is hereby incorporated by reference herein in its entirety.

BACKGROUND OF THE INVENTION

1. Field of Invention

This invention relates to a microprocessor having a reconfigurable n-way cache to provide increased bandwidth for signal processing as well as general purpose applications.

2. Description of Related Art

There is a fundamental difference in the way microprocessor and digital signal processors (DSP) are designed and used in system realization. Whereas microprocessors are designed to execute general purpose applications as efficiently as possible, digital signal processors (DSPs) are designed to execute only specific applications (such as speech processing) as efficiently as possible. Systems based on microprocessors are designed to run any general application. Some of these applications may not be run on the system until years after the system was shipped. On the other hand, systems based on a DSP are designed to run, in general, only a small set of specific applications, e.g., a telephone answering machine runs only a specific application throughout its lifetime. Once a system based on a DSP is shipped, typically, no new applications are run on it.

Due to this difference in the way microprocessors and DSPs are used, the design styles for these two types of processors have evolved quite differently. However, both processors are designed to provide high performance cost effectively.

Many conventional processors have multi-ported register files, and are therefore capable of providing two or more operands contained in registers to the execution unit (EU) every cycle. The register files are contained on the same integrated circuit as the arithmetic logic unit (ALU), and are very fast devices for providing the desired data. For example, referring to FIG. 1, a typical prior-art microprocessor 100 includes an instruction register 101 that supplies a first address (ADDR0) to a first register file 102, and a second address (ADDR1) to a second register file 103. The register files 102 and 103 illustratively have 32 entries of 32 bits each. The first register file 102 supplies a first operand to a first operand register 104. The second register file 103 supplies a second operand to a second operand register 105. The registers 104 and 105 supply the first and second operands to the arithmetic logic unit (ALU) 106, which may perform various arithmetic operations, illustratively including a multiply-accumulate (MAC) operation. The result is stored in the result register 107, and may be written back into the register files via a signal line 108. In an alternate embodiment, a single dual-ported register file (not shown) is used in lieu of the two register files 102 and 103. In that case, two read ports allow simultaneous access to any two entries in the register file.

Although a register file provides efficient temporary storage, memory organization plays a critical role in determining the performance of microprocessors and DSPs. This is because the performance is determined by how efficiently instructions and data are accessed from the memory. Since speed of discrete memories has not kept pace with the processor speeds, typically, on-chip storage is provided for both instructions and data. Microprocessors and DSPs differ in the way in which this on-chip memory is organized.

There are many instances where it is necessary to supply two operands, contained in memory, that are not already in the on-chip registers. An example is a multiply-accumulated instruction which is one of the basis primitives of signal processing. A typical instruction is MAC x, y, a0 where MAC is the mnemonic for the instruction "multiply accumulate" and the operation specified is:

$a0=a0+(x*y)$

Typically, x and y belong to specific arrays in the memory. For example, x may be located in a coefficient array and y may be located in a data array.

The two memory operands x and y are typically contained in an on-chip data memory, if available, or in a memory external to the microprocessor chip. In either case, supplying two operands to the ALU every cycle implies dual-porting the data memory.

FIG. 2 shows an example of a DSP 200 having two banks of on-chip memory. An instruction register 201 supplies first and second addresses (ADDR0, ADDR1) to a first bank 202 and a second bank 203 of the RAM, where each bank 202 and 203 is illustratively 1 kilobyte in size. The data is written to the RAM via a write line 213. The first operand is read from the bank 202 and output to a multiplexer 204. Similarly, the second operand is read from the second bank 203 and output to a multiplexer 206. Assuming the multiplexers 204 and 206 select the outputs of the RAM banks 202 and 203, the first operand is then latched into a first operand register 205, while the second operand is then latched into a second operand register 207. Alternatively, the operands may be selected by the multiplexers 204 and 206 from an external memory bus 212.

The operands are then provided from the operand registers 205 and 207 to the ALU/MAC unit 208, where they are multiplied together and added to the previous result accessed from an accumulator file 210 via a second line 214. The result is provided to the result register 209 and stored in the accumulator file 210.

Although this technique provides for the multiply/accumulate function within a conventional DSP architecture, there are disadvantages of this approach. For example, since the on-chip memory is configured as RAM rather than as a cache memory, only selected applications can utilize it. All the data addresses in the memory have to be determined when the application program is developed. Thus, conventional microprocessor applications cannot make flexible use of this memory. Furthermore, it is difficult to run applications from different vendors that are installed in the field.

Since any application may be run on a microprocessor-based system, its characteristics are not known in advance. On-chip caches are conventionally used in microprocessors to improve performance. The cache works based on temporal locality and spatial locality. Temporal locality means that once a given memory location is used, it is likely that it may be used in the near future. Spatial locality means that once a memory location is used, it is likely that locations in the vicinity of that location may be used in the near future.

FIG. 3 shows a schematic diagram of a 2-way set-associative cache and how it is addressed, as described in

*Computer Architecture: A Quantitative Approach*, J. L. Hennessy and D. A. Patterson, Morgan Kaufmann Publishers, Inc. pp. 408–414, 1990 (*Computer Architecture*). The cache includes data portions 305 and 306 and tag portions 307 and 308. The cache has n blocks or lines. A block typically includes more than one byte of storage. A byte within a block is addressed by the block offset field 304 of the address 301. For example, if the block size is 8 bytes, block offset field is 3 bits. The index field 303 of the address 301 is used to select the set in the cache. Each set in a 2-way associative cache has two blocks. The block frame address 302 is stored in the tag portion associated with the data portion where the block is stored. When a cache block is first written, a set is specified by the index 303 portion of the address. The block within the set is determined by a selection algorithm, such as, random replacement or least recently used (LRU). Once a block is selected, the block frame address 302 is written in the tag portion 307 or 308 and the block from memory is written in the data portion 305 or 306 corresponding to the selected block. A special bit is provided in the tag portions 307 and 308 to indicate that a given entry in the cache contains valid data. In general, there are other control bits in the tag portions 307 and 308 to store other information, such as privilege level, etc.

At a later time, the processor may request data at a specified memory address 301. In order to check whether a specific data address "hits" in (i.e., is in) the cache, the index 303 portion of the address is used to select the set. For a 2-way associative cache, there are two sets of tags 307 and 308 and data 305 and 306, which are accessed simultaneously using the index 303. The two output tags 307 and 308 are compared with the block frame address 302 using the comparators 309 and 310. If neither tag 307 or 308 equals the block frame address 302, a cache miss has occurred. On the other hand, if one of the tags 307 or 308 is equal to the block frame address 302 and the valid bit is set, a cache hit has occurred, and the data corresponding to the matching tag is correct data that is selected by a multiplexer 311 using the hit signals. The appropriate byte(s) within the data 312 are then accessed using the block offset field 304.

A cache that has only one block per set is referred to as a direct mapped cache. Furthermore, a cache that has n blocks per set is referred to as a n-way set-associative cache.

Conventionally, virtual memory is used to appear to the application as much more memory than is physically available. This is achieved through secondary storage, such as a disk drive. Thus, an application generates virtual instruction and data addresses. These addresses are translated using page directory and page table entries and hardware table walk. For faster translation, virtual address-to-physical address translations are cached in an on-chip memory called a Translation Look-aside Buffer (TLB), as described in *Computer Architecture*, pp. 432–449.

A major advantage of caches is that they adapt to the dynamics of the application being run, based on temporal and spatial locality. A major disadvantage of caches is that there is some uncertainty about whether a given location is guaranteed to be in the cache. Events, such as an interrupt, may change the execution flow and "pollute" the cache. If required memory locations are not guaranteed to be on-chip, the computation may not be completed in the time allocated. This may not be acceptable for DSP applications.

Accordingly, DSPs conventionally do not use on-chip cache for instruction and data storage. Since a small set of applications run on a DSP, the instructions are typically contained in an on-chip ROM. Furthermore, since the data storage requirements for DSP applications are known in advance, the data is allocated in on-chip memory banks. On-chip cache differs from on-chip memory banks in that on-chip cache can store data at any absolute memory location, whereas an on-chip memory bank stores data only at specified memory locations.

Recently, a new class of devices, called Personal Communicators, are becoming available. These devices integrate communications capabilities, such as voice, data, and fax communications using a cellular phone, with personal organizers. These devices currently use a separate DSP for communications tasks and a general purpose microprocessor for the other tasks.

SUMMARY OF THE INVENTION

This invention provides a data processor having a cache with an n-way associativity, wherein a first operand is located in a first portion of the cache and a second operand is located in a second portion of the cache. The outputs of the first and second portions of the cache are provided to a functional unit when a given instruction type is executed. The functional unit is, for example, a multiply-accumulate unit. The instruction type is, for example, a multiply-accumulate unit instruction. A multiplexer is connected to the outputs of the first and second portions of the cache. Therefore, operands can be retrieved from either portion when the cache is to be accessed as a conventional set-associative cache for executing other types of instructions. For controlling writing into the cache, a translation look-aside buffer may include a page table entry having a reconfigure field. Alternatively, other methods may be used.

This invention enables a two (or more)-way set associative cache to be used in a conventional way for general purpose computing applications. Furthermore, the same cache, with modest additional hardware, can be used to provide two memory operands simultaneously.

These and other features and advantages of this invention are described in or are apparent from the following detailed description of the preferred embodiment.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 4:
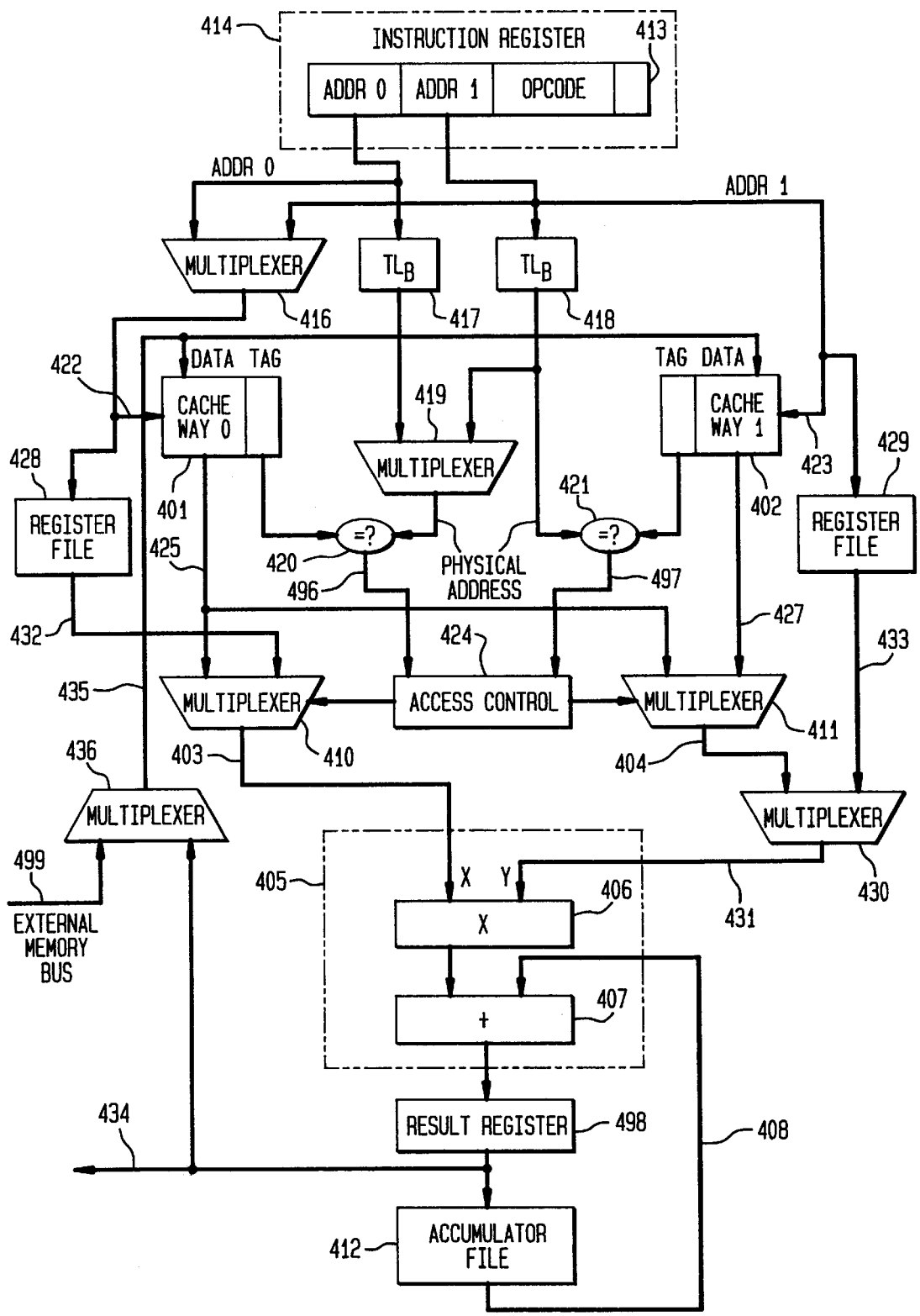
FIG. 4 shows an illustrative embodiment of a microprocessor according to this invention.

FIG. 4 shows an illustrative embodiment of a microprocessor using the reconfigurable set-associative cache of this invention. In particular, the cache is a 2-way set-associative cache. The microprocessor also has a dual port register file. In a first configuration, the cache provides one operand. In a second configuration, the cache provides two or more operands simultaneously to an arithmetic processor when an instruction that requires high data bandwidth is performed. As used herein, "simultaneously" means in the same "machine" cycle, which may comprise one or more "clock" cycles. One such instruction is the "multiply-accumulate" instruction. In this manner, fast multiply-accumulate operations may be implemented in a general-purpose microprocessor. The cache of this invention is preferably an n-way set-associative cache, and techniques of this invention allow the n-way set-associative cache to be used as two or more direct-mapped caches. Reconfiguring the cache from the n-way set-associative cache to the plurality of direct-mapped caches, and vice-versa, may be accomplished on a per-instruction basis. As used herein, the cache portions are also referred to as "cache way 0", "cache way 1", or more generally as "cache way n", wherein n is a positive integer.

The instruction register 414 illustratively contains a machine instruction 413 for the processor. ADDR0 and ADDR1 provide two addresses and the opcode indicates the operation to be performed (e.g. add, subtract, etc.). If ADDR0 and ADDR1 refer to data from the register files 428 and 429, the corresponding data is accessed from the register files 428 and 429 via the data output lines 432 and 433. A multiplexer 410 passes the data on the signal line 432 or the data on a signal line 425 to a first input of a multiplier 406 of an ALU 405, via a signal line 403. At the same time, a multiplexer 411 passes data on the signal lines 425 or 427 to a multiplexer 430 on a signal line 404. The multiplexer 430 passes data on the signal line 433 or the signal line 404 to a second input of the multiplier 406 via a signal line 431. The operation indicated by the opcode of the instruction 413 is carried out in the ALU 405. The result output from the multiplier 406 and/or the accumulator 407 is written to the result register 498, and may be mapped in the register files 428 and 429 (via paths not shown). The result may also be written to the external memory via an external memory bus 434. As indicated above, the register files 428 and 429 together may form a dual ported register file.

Figure 1:
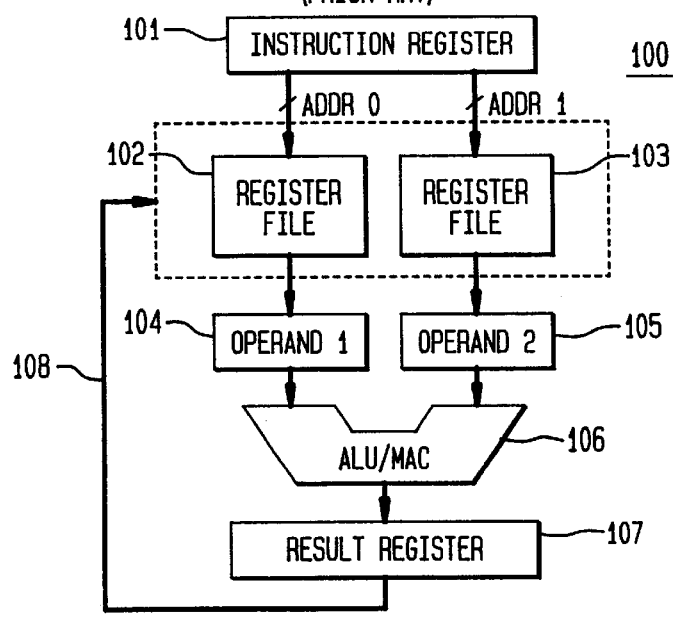
FIG. 1 shows a conventional microprocessor having two register files for storing operands.
Figure 2:
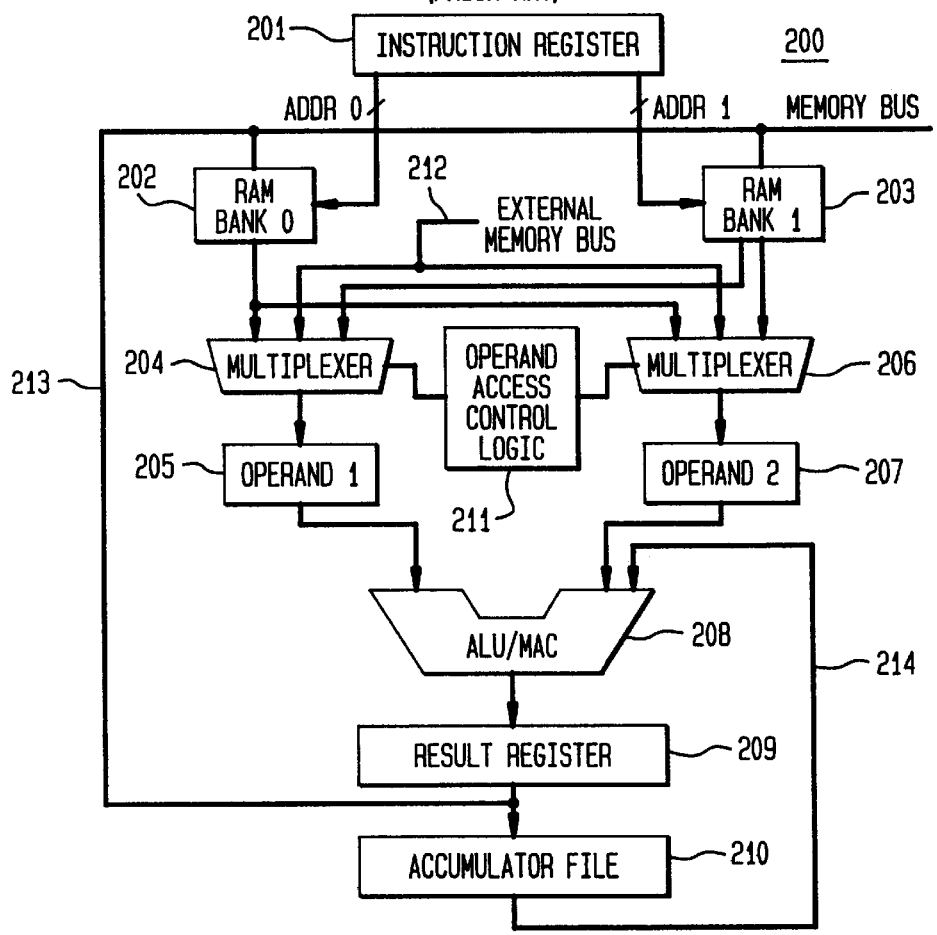
FIG. 2 shows a conventional digital signal processor having an on-chip random access memory comprising multiple banks for storing operands.
Figure 3:
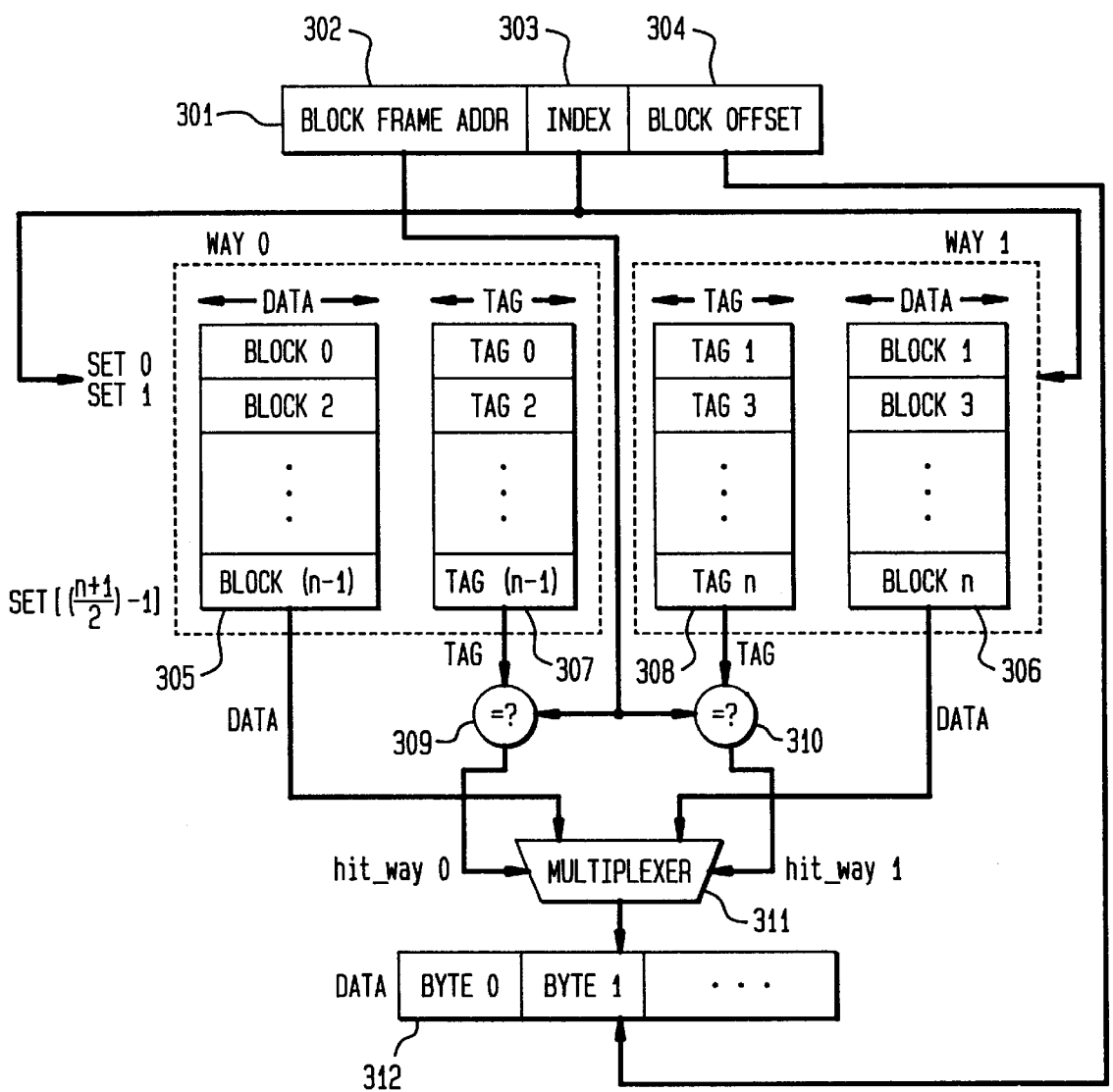
FIG. 3 shows a conventional 2-way set associative cache.

The instruction register 414 may store an instruction such that ADDR1 refers to a memory operand, and ADDR0 may be a memory or a register operand. In this case, as described above with respect to FIG. 2, the index portion of ADDR1 is used to access tag and data within the same set from a cache 401 and a cache 402. Assuming ADDR1 is a virtual address, corresponding upper address bits are translated by the TLB 418. These upper address bits form the block frame address. This address is compared to the tag from cache 401 and cache 402 via equality comparators 420 and 421. If the comparison is valid, the corresponding cache 401 or 402 has valid data. The left hit (LHIT) and right hit (RHIT) signals on the signal lines 496 and 497, respectively, are used to control the multiplexer 411 to select one of the data signal lines 425 and 427 and to control the multiplexer 410 to select one of the data signal lines 432 and 425 via the Access Control 424. The multiplexer 430 outputs the data on the signal line 404 to the second input of the multiplier 406 via the signal line 431. It should be appreciated that, in contrast, in a conventional cache, only one memory operand is fetched at a time.

The data is stored into the cache 401 and the cache 402 via a signal line 435 after the multiplexer 436 selects as an input either the external memory bus 499 or the output from the result register 498 via a signal line 434.

Signal processing requires accessing two operands simultaneously, e.g., for a multiply accumulate instruction, from memory, as described above. One of the operands may be the coefficient and the other operand may be data, e.g., for dot product computation. In this invention, the cache is used by both general purpose applications as well as signal processing applications as described below.

It is assumed that the processor runs either a general purpose application or a signal processing application at any given instant. If a general purpose application is being run, the cache functions as a conventional 2-way set associative cache as described above. If, on the other hand, a signal processing application is being run, the cache is used as two direct mapped caches.

The data output from the cache 401 and the cache 402 is provided to the ALU 405 via the data lines 403 and 431, respectively. In addition to the data input via the signal lines 403 and 431 to the multiplier 406, the ALU 405 also receives accumulator data via a signal line 408 from the accumulator file 412, which is input directly to the accumulator 407. The ALU 405 is a multiply-accumulate unit and comprises the multiplier 406 and the accumulator 407 for illustrative purposes only. However, the ALU 405 may be of various designs, including those known in the art. When a multiply-accumulate instruction is executed, the ALU 405 is instructed to perform the multiply-accumulate function on the operand x accessed from the cache 401 via the multiplexer 410, and the operand y accessed from the cache 402 via the multiplexer 411 and the multiplexer 430. However, when another type of instruction is being executed that does not require simultaneous operands from the cache 401 and the cache 402, the multiplexer 411 selects the cache 401 or the cache 402, if there is a cache hit. In this case, the cache is access as a conventional 2-way set-associative cache.

The instruction register 414 may encode an instruction that refers to two memory operands referred to by addresses ADDR0 and ADDR1. This instruction indicates that the 2-way set-associative cache is to be treated as two direct mapped caches. ADDR0 and ADDR1 refer to elements of two arrays X and Y and the operation being performed may be a "dot product" of these two arrays. As will be described below, the two arrays will be loaded such that all the elements of the x array will be guaranteed to be in cache 401 and those of the y array will be guaranteed to be in cache 402.

An index portion of ADDR1 is used to access the corresponding cache 402 and, as described above, the data and tag portion is accessed. The block frame address part of ADDR1 is translated from a virtual address to a physical address by the TLB 418 and is then compared to the tag from the cache 402 via the comparator 421. If there is a match, and the valid bit is set, the RHIT signal is output from the comparator 421 via signal line 497, and indicates the availability of the data. The special nature of the instruction forces the multiplexer 411 to select the data output from the cache 402 via the signal line 427, which is then supplied as the operand y via the signal line 431 through the multiplexer 430. The index portion of ADDR0 is selected by the multiplexer 416 and forwarded to the cache 401 to access the data and tag portion. The TLB 417 is used to translate the block frame address from a virtual address to a physical address. This physical tag is then compared to the tag from the cache 401 via the comparator 420. If there is a match, and the valid bit is set, the LHIT signal is output from the comparator 420 via the signal line 496, and indicates the availability of the data on the signal line 425. This data is supplied as the operand x by the multiplexer 410 selecting the data on the signal line 425 and supplying the data via the signal line 403.

It should be appreciated that the illustrative embodiment is for a 2-way set-associative cache. However, this invention may be implemented for any n-way set-associative cache, where n is any positive integer. n is illustratively an even integer in the following discussion (and illustratively n=2), but n may be an odd integer. In general, this may be accomplished using a multiplexer having n-inputs, one from each cache portion. When n is greater than 2, the distribution of the n ways for accessing the two operands is determined by the specific implementation, any of which may be used with this invention. In addition, when the cache is configured as a conventional n-way set associative cache, the replacement algorithm for the cache may be accomplished using any technique insofar as this invention is concerned.

Figure 5:
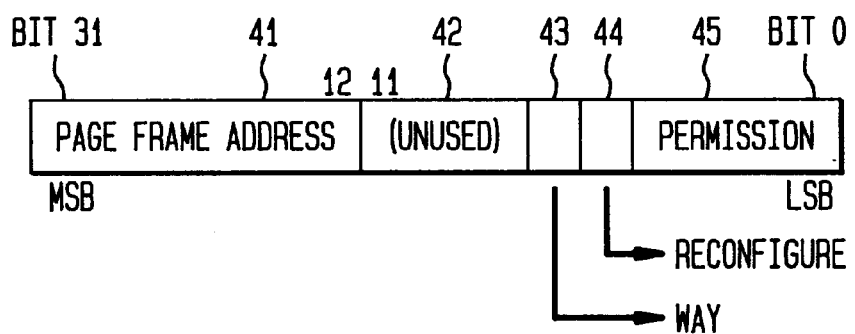
FIG. 5 shows an illustrative page table entry according to this invention.

How the data for the x array is guaranteed to be in the cache 401 and that for the y array is guaranteed to be in the cache 402 is now described. As is known in the art, memory management page translations are used to translate virtual addresses to physical addresses, and also to control cache operation. The page tables are cached in the translation look-aside buffer (TLB), which converts virtual memory addresses into physical memory addresses. The TLB also provides control information for memory pages, and determines whether a given page is cacheable. FIG. 5 shows an illustrative page table entry of the TLBs 417 and 418. The page table entry includes a page frame address in a field 41 (bits 12 to 31). Bits 12–31 are the most significant bits of the address. The page frame address is used to determine whether the desired address is located within the cache, in which case a cache "hit" is indicated by the LHIT signal via the signal line 496, or the RHIT signal via the signal line 497, as shown in FIG. 4. The field 42 may include unused bits. The field 45 typically includes "permission" bits that control whether the data in the memory page is writable, valid, cacheable, and/or user-accessible. These fields may be in any order insofar as this invention is concerned.

Figure 6:
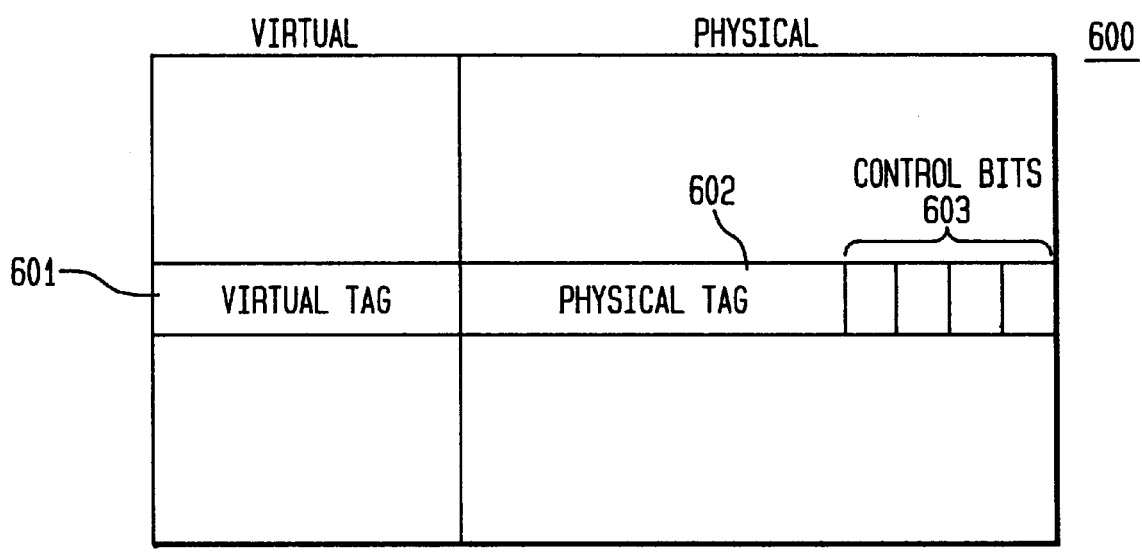
FIG. 6 shows an illustrative translation lookaside buffer usable in implementing this invention.

FIG. 6 shows a TLB which includes the illustrative page frame address as a physical tag 602 and control bits 603, along with the virtual tag 601. In this manner, the virtual address 601 is translated into a physical address 602 according to principles known in the art.

To implement the inventive technique as described above, one or more additional control bits may be included in the memory management page tables, as shown in FIG. 5. For example, the field 43 may include an even/odd "way" bit that indicates how data is to be written into the caches 401 and 402. The field 44 may include a "reconfigure" bit. When the reconfigure bit is "0", the cache is treated as a conventional 2-way set-associative cache. That is, the data is written into the cache 401 and the cache 402 using the chosen cache entry replacement scheme. On the other hand, when the reconfigure bit is "1", the 2-way set-associative cache is treated as two direct-mapped caches. In this case, data is written to even-way cache portions if the way bit in field 43 is "0", and is written to odd-way cache portions if the way bit in field 43 is "1". In this manner, the data is placed into the appropriate cache portions to serve as the x and y operands for executing a multiply-accumulate instruction, or other special type of instruction, by the ALU 405. In the presence of an operating system (OS), a user program may direct the OS to set the "reconfigure bit" and "way bit" via a special function call. In this manner, a data processing system including both a data processor and the operating system may advantageously utilize this inventive technique.

By convention, the left operand (i.e., the operand x in the above example) is fetched from the cache 401, and the right operand (i.e., the operand y in the above example) is fetched from the cache 402. However, other conventions are possible. Furthermore, still other techniques for controllably writing data into the cache 401 and the cache 402 are usable with this invention. For example, an instruction which loads the cache could explicitly specify which portion of the cache the data should be written into. To accomplish this, one or more "way" bits may be included in the instruction register 413 of FIG. 4. In that case, a memory management unit and the TLBs 417 and 418 may not be necessary. Also, the distribution of the x and y data need not be separated into even and odd way caches, but could be distributed among the caches in any convenient manner. Finally, more than two operands may be fetched simultaneously from the caches for various operations performed by the functional unit, as will be apparent to persons of skill in the art.

While the data processor of this invention is typically of the type conventionally referred to as a "microprocessor", still other designations and types are possible. For example, a special purpose computer, a programmable microprocessor, a micro-controller and peripheral integrated circuit elements, an ASIC or other integrated circuit, a hardware electronic or logic circuit such as a discrete element circuit, a programmable logic device such as a PLD, PLA or PAL, or the like may be used.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A data processor comprising:
   an instruction register;
   an n-way set-associative cache, comprising n subcaches, where n is an integer greater than 1;
   a functional unit that operates on a first operand and a second operand when an instruction is executed;
   a first signal path from a first subcache of the said n subcaches to supply the first operand to the functional unit;
   a second signal path from a second subcache of the said n subcaches to supply the second operand to the functional unit simultaneously with the first operand when certain instructions are executed; and
   a multiplexer for selecting data from one of the subcaches when other instructions are executed.

2. The data processor of claim 1, further comprising a translation look-aside buffer having page table entries which include a reconfigure field that controls whether a regular cache line replacement algorithm is to be used or a special cache line replacement scheme is to be used.

3. The data processor of claim 2, wherein the page table entries further include a way field that provides that a first set of data is written into an even-way subcache, and a second set of data is written into an odd-way subcache.

4. The data processor of claim 1, wherein the instruction register includes at least one control bit to control writing of data into the n-way set-associate cache.

5. The data processor of claim 1, wherein the certain instructions include a multiply-accumulate instruction.

6. The data processor of claim 1, wherein the functional unit is an arithmetic logic unit.

7. The data processor of claim 6, wherein the arithmetic logic unit is a multiply-accumulate unit.

8. A data processor comprising:

a data memory having a first cache and a second cache;

a multiply-accumulate unit that operates on a first operand and a second operand simultaneously when a multiply-accumulate instruction is executed;

a first signal path from the first cache for supplying the first operand to the multiply-accumulate unit;

a second signal path from the second cache for supplying the second operand to the multiply-accumulate unit; and a multiplexer for selecting data from either the first cache or the second cache when other instructions are executed.

9. The data processor of claim 8, further comprising a translation look-aside buffer having page table entries, wherein a reconfigure field of the page table entries controls how the data is written into the first and second caches.

10. The data processor of claim 9, wherein the page table entries further comprise a way field that indicates whether a first set of data is written into the first cache as an even-way direct-mapped cache, and a second set of data is written into the second cache as an odd-way direct mapped cache.

11. A data processing system including a data processor, comprising:

an instruction register;

an n-way set-associative cache where n is an integer greater than 1 and which includes a first cache and a second cache;

a functional unit that operates on a first operand and a second operand when an instruction is executed;

a first signal path from the first cache for supplying the first operand to the functional unit;

a second signal path from the second cache for supplying the second operand to the functional unit simultaneously with the first operand when a special type of instruction is executed;

a multiplexer for selecting data from either the first cache or the second cache when another type of instruction is executed;

a translation look-aside buffer having page table entries which include a reconfigure field that controls how the data is written into the n-way set-associative cache, and a way field that provides that a first set of data is written to an even-way cache, and a second set of data is written into an odd-way cache; and an operating system which sets the reconfigure bit and the way bit.

12. The data processor of claim 11, wherein the special type of instruction includes a multiply-accumulate instruction.

13. The data processor of claim 11, wherein the functional unit is an arithmetic logic unit.

14. The data processor of claim 13, wherein the arithmetic logic unit is a multiply-accumulate unit.

* * * * *